C. E. REDDIG.
ENGINE DRIVEN ELECTRIC GENERATOR UNIT.
APPLICATION FILED SEPT. 17, 1920.

1,432,903. Patented Oct. 24, 1922.

Inventor:
Charles E. Reddig
by Howard M. Morse
Atty.

Patented Oct. 24, 1922.

1,432,903

UNITED STATES PATENT OFFICE.

CHARLES E. REDDIG, OF RICHMOND HILL, NEW YORK, ASSIGNOR TO WESTERN ELECTRIC COMPANY, INCORPORATED, OF NEW YORK, N. Y., A CORPORATION OF NEW YORK.

ENGINE-DRIVEN ELECTRIC GENERATOR UNIT.

Application filed September 17, 1920. Serial No. 410,817.

*To all whom it may concern:*

Be it known that I, CHARLES E. REDDIG, a citizen of the United States, residing at Richmond Hill, Long Island, in the county of Queens and State of New York, have invented certain new and useful Improvements in Engine-Driven Electric Generator Units, of which the following is a full, clear, concise, and exact description.

This invention relates to engine driven electric generating units and is particularly, although not exclusively, useful in connection with units of this kind which are adapted for operation in connection with a storage battery to furnish light and power on farms and in other places where a supply of electric current is not available.

The general object of this invention is to provide in such a unit, new and improved means whereby the engine and the generator may be cooled by air drawn or forced through them during operation. The invention which attains this object is characterized by a fly wheel which is located between the engine and the generator and serves as a partition between the ventilating passages through the engine and through the generator, and which carries on its opposite sides fan blades which serve respectively to draw or force air through the ventilating passages of the engine and generator.

Figure 1:
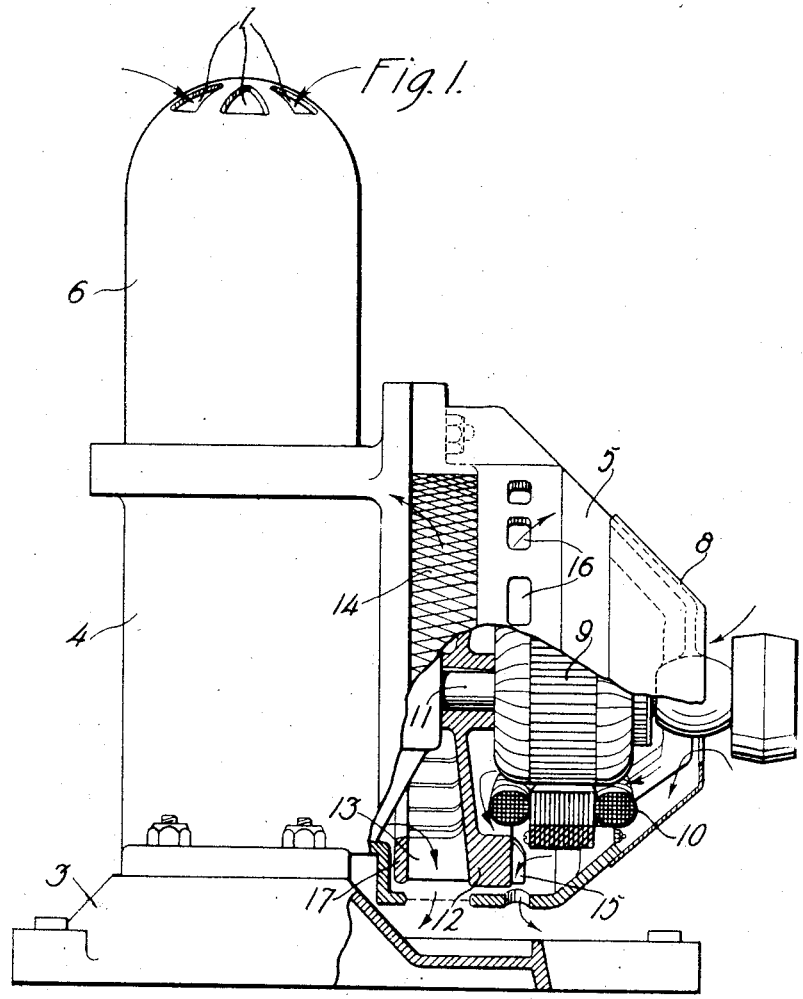
Figure 2:
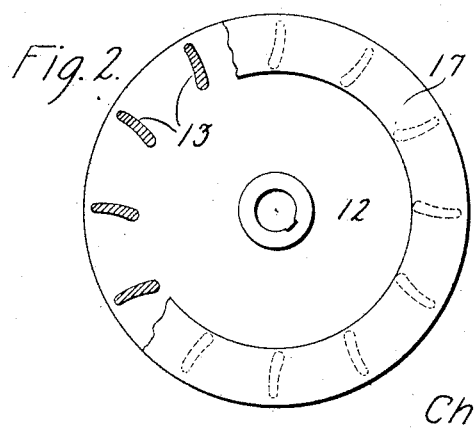

The invention will be understood from the following description taken in connection with the accompanying drawing in which an embodiment of it is described and illustrated. In the drawing, Fig. 1 is a side elevation, partly in section, showing an engine driven electric generating unit embodying the invention; and Fig. 2 is an end elevation, partly in section, of the fly wheel which carries two sets of fan blades, as hereinafter described.

Referring to the drawing, the power unit is shown as comprising, in general, a base 3, an engine 4 mounted thereon, and a generator 5 bolted to the engine frame. Except for indicating that the engine is provided with a ventilating casing 6 having openings 7 through which air may be caused to pass for the purpose of cooling the engine, the details of the latter are not shown since they form no part of the present invention. The generator 5 is also so constructed and so provided with a casing 8 that air may be caused to pass through it for the purpose of cooling it during operation; its armature is shown at 9 and the field coils at 10. The engine 4 and generator 5 are direct-connected and between them on their common shaft 11 is a fly wheel 12. The fly wheel 12 is axially imperforate and serves as a partition between the ventilating passages through the engine and those through the generator. On the side of the fly wheel toward the engine, fan blades 13 are provided which cause a current of air to pass through the engine casing and through a screened opening 14 between the engine and generator frames. The other side of the fly wheel 12, which is toward the generator, is also provided with fan blades 15 which cause air to pass through the generator and through openings 16 in the generator frame. The fan blades 13 and 15 may be of any suitable form. As shown, fan blades 13 extend axially from the face of the fly wheel 9 and at their outer ends are covered by a plate 17; while fan blades 15, which are much smaller, extend axially from the other face of the fly wheel and are not covered at their ends. This construction is permissible, because the volume of air which it is necessary to cause to pass through the engine casing is much greater than the volume of air which it is necessary to pass through the generator, in order to provide for the necessary cooling. In the device shown, as is indicated by the arrows, the fan blades are so arranged that air is drawn through the engine casing and the generator and expelled through the openings 14 and 16. But it is obvious that it would be possible to arrange the fan blades so that air would be forced through the engine casing and the generator in the opposite directions.

What is claimed is:

1. In combination, an engine having a ventilating casing, a generator constructed to permit the passage of air therethrough and direct-connected to the engine, a fly wheel located between the engine and the generator and serving as a partition between the ventilating passages through the casing of the engine and through the generator, a set of fan blades located on one side of the fly wheel and serving to cause air to pass through the ventilating casing of the engine, and another set of fan blades located on the other side of the fly wheel and serving to cause air to pass through the generator.

2. In combination, an engine, a generator direct-connected thereto, an axially imperforate fly wheel located between the engine and the generator, fan blades carried by the opposite faces of the fly wheel, and casings cooperating with the engine, the generator and the fly wheel, whereby the engine and generator are cooled by two independent currents of air caused to pass through the casings by the fan blades.

In witness whereof, I hereunto subscribe my name this 15th day of September, A. D. 1920.

CHARLES E. REDDIG.